June 21, 1932.  D. J. BRADSHAW  1,864,404
MACHINE FOR THE RETAIL MARKETING OF BLOCK CHEESE AND THE LIKE
Filed April 16, 1931  2 Sheets-Sheet 1

David John Bradshaw INVENTOR
BY Munn & Co.
ATTORNEYS

June 21, 1932. D. J. BRADSHAW 1,864,404
MACHINE FOR THE RETAIL MARKETING OF BLOCK CHEESE AND THE LIKE
Filed April 16, 1931   2 Sheets-Sheet 2
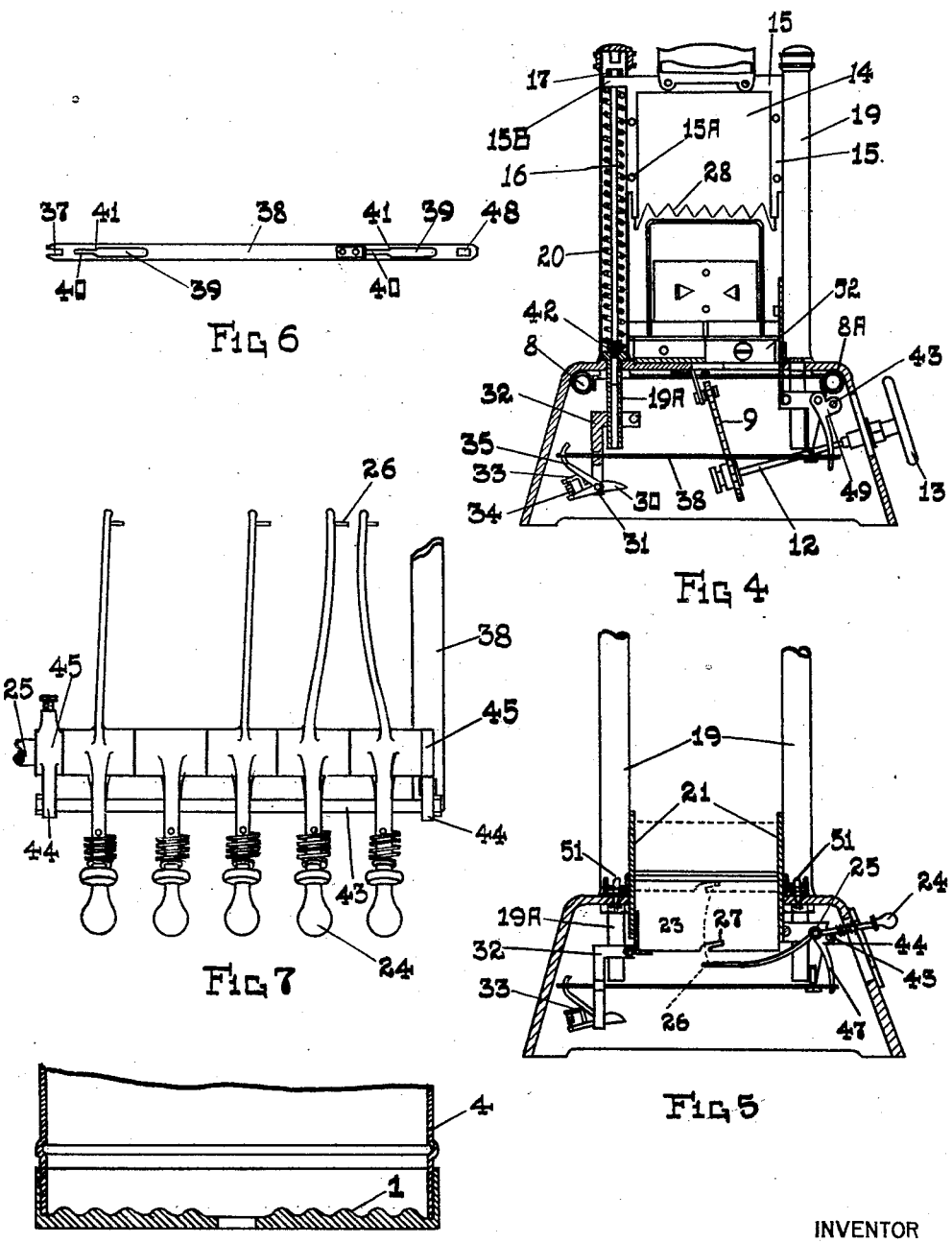
INVENTOR
David John Bradshaw
BY Munn & Co.
ATTORNEYS Patented June 21, 1932

1,864,404

UNITED STATES PATENT OFFICE

DAVID JOHN BRADSHAW, OF ELWOOD, VICTORIA, AUSTRALIA

MACHINE FOR THE RETAIL MARKETING OF BLOCK CHEESE AND THE LIKE

Application filed April 16, 1931, Serial No. 530,693, and in Australia May 8, 1930.

My invention relates to improvements in cutting machines for the retail marketing of food commodities and it is especially applicable to pasteurized block cheese, wrapped in tin foil or the like, but can also be used for the cutting of other commodities which are supplied to the retailer in elongate blocks of uniform dimensions and density.

The objects of my invention are, first, to enable different weights of the commodity to be cut off as desired and, second, to protect the cut face of the block of the commodity against drying, contamination and other deteriorating influences.

I attain these objects by the mechanism illustrated in the accompanying drawings in which:

Fig. 4 is a vertical cross section taken on the line F4—F4 of Fig. 2.

Fig. 5 is a vertical cross section taken on the line F5—F5 of Fig. 2.

Figs. 6, 7 and 8 are drawn on a larger scale than the preceding figures.

Fig. 6 is a view of a detail.

Fig. 7 is a view of portion of the selector mechanism, and

Fig. 8 is a sectional view of the slideway for the cheese.

This machine has been developed primarily from appreciation of the fact that with commodities, such as some types of block cheese, which are prepared in blocks of uniform dimensions and of uniform density, the different weights desired of any particular commodity can be supplied to the customer by cutting off predetermined lengths from the block.

As this machine is especially applicable to the cutting of block cheese of the type specified it will be described in relation thereto.

Figure 1:
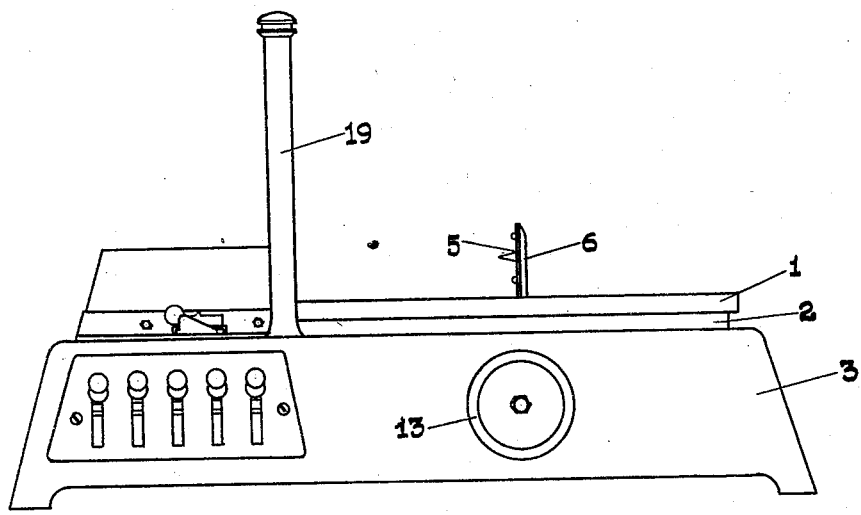
Fig. 1 is a side elevation of the machine.
Figure 2:
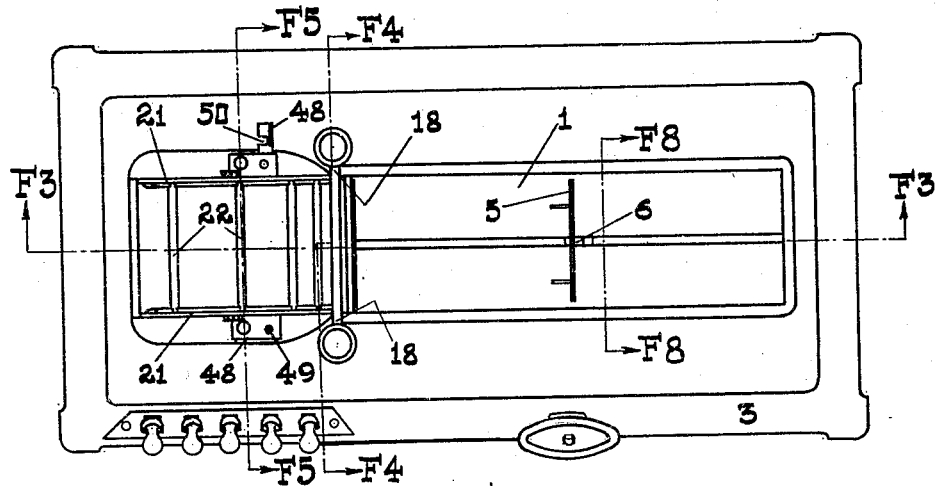
Fig. 2 is a plan.
Figure 3:
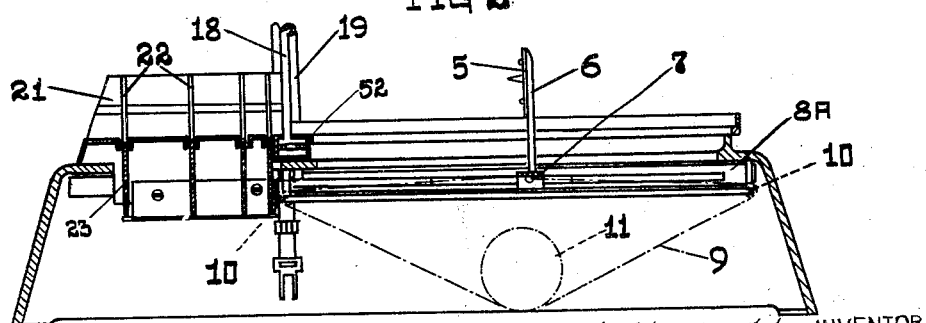
Fig. 3 is a vertical longitudinal section taken along the centre line F3—F3 of Fig. 2.

A horizontal slideway, upon which the block of cheese is placed when the machine is in use, is formed of corrugated metal 1 supported on a metal frame 2 connected to the body 3 of the machine. The corrugations allow the block of cheese to slide thereon with a minimum of friction. A glass cover 4 protects the cheese and accommodates a pusher plate 5 carried by a pillar 6 supported by a cross-bar 7 carrying on its ends guide cylinders 8 which slide freely in cylindrical guideways 8A which are cut away on their inner faces to allow the junctions of the guide cylinders with the cross-bar to slide along. The cross-bar is connected to an endless chain 9 passing around sprocket wheels 10 and driven by a larger sprocket wheel 11 connected by a shaft 12 to a hand wheel 13 so that a turn or partial turn of the hand wheel will move the pusher plate and block of cheese forward to a substantial extent when the knife has been raised out of the path of the cheese. The knife 14 is mounted in a recessed frame 15 and held in position by screws 15A so that it is readily replaceable. The frame 15 is connected to vertical rods 16 by nuts 17 and slidable in slots 18 (Fig. 3) provided in tubular pillars 19 upstanding from the base of the machine.

A spring 20 in each of the tubular pillars bears against a guide disc 15B connected to the frame 15 and thus resists the downward movement of the knife, but the rods 16 are carried down with the knife and are locked in the lowered position as hereinafter described, so that when a length of cheese has been cut off the block by the knife blade the latter remains in the lowered position and covers the freshly cut face of the cheese. As the drying action penetrates into block cheese at the rate of approximately from one eighth to one quarter of an inch in twenty-four hours according to atmospheric conditions, the protection of the cheese in this manner is of considerable importance and even during the busy parts of the day it protects the cheese from contamination and maintains its fresh appearance. The selector mechanism is positioned in front of the knife and comprises a frame 21 having a series of slots 22 in each of which a stop plate 23 is adapted to be raised by the action of one of a series of selector keys 24. These lever keys are pivoted at 25 on a common shaft and their inner ends have offset pins 26 adapted to engage in a slot 27 provided in the lower edge of its corresponding stop plate and shaped to conform to the path traversed by the pin when the selector key is swung downwardly. This path is shown in dotted lines in Figure 5. In this way a stop plate is raised in the correct position when the corresponding selector key is depressed and at the same time the knife is released as hereinafter described. The block of cheese is then fed forwardly and when the front edge of the cheese abuts against the inner face of the stop plate the correct length of the block will lie in front of the knife. The knife is now pressed by the hand and cuts off the required length from the block of cheese.

The knife blade is provided with an inclined cutting edge and preferably with a multi-angular cutting edge 28 so that at every portion of the stroke the portion of the cutting edge which is in contact with the tin foil is inclined in the plane of the cut. Thus the shape of the knife facilitates the cutting of the tin foil and cheese with a clean action and thus avoids distortion of the block and tearing of the tin foil. When the knife is pressed downwardly the bottom of one of the rods 16 strikes the projecting end 30 of a lever pivoted at 31 on a bracket 32 by which it is supported from a bush 19A forming an extension of one of the vertical pillars 19 and the other end 33 of this lever is connected by a spring 34 to one arm of a bell crank lever 35, the other arm of which fits in a slot 37 in a horizontal bar 38 and throws this bar rapidly to one side. This bar has other slots 39 through which the lower ends of the rods 16 pass and these slots have narrower extensions 40 forming shoulders 41 which engage annular grooves 42 in the lower ends of the rods and thus lock these rods and the knife in the lowered position at the completion of the downward movement of the knife. The stop plate is then returned to the lowered position by automatically raising the selector key, as hereinafter explained, so that its offset pin 26 draws down the stop plate to the lowered position and at that portion of its movement is then free to pass out of the slot as indicated by the dotted line in Figure 5. The portion cut off the block will then be the required length and weight and may be wrapped up and handed to the customer. The selector mechanism may be provided when desired, with means to denote monetary value instead of weight.

When it is desired to serve another customer the selector key in question is depressed and engages a striker bar 43 which is common to all the selector keys. This bar is carried by lugs 44 offset from collars 45 (Fig. 7) pivoted upon the shaft upon which the selector keys also are pivoted at 25. The collar at the inner end of this bar is provided with a downwardly extending finger 47 passing through a slot 48 in the sliding bar, so that depression of any selector key engages the striker bar 43 and moves the finger 47 so as to return the sliding bar to its previous position and thus moves the shoulders 41 out of engagement with the grooves 42 on the ends of the rods 16. This allows the knife to return to its upper position under the action of the springs. Selector keys may be provided for two-pound, one-pound, half-pound and quarter-pound pieces. In addition a fifth key is normally provided to operate the release gear of the knife when the machine is to be refilled. By the reverse action of the striker bar mechanism, lowering of the knife returns selector keys and stop plates to their normal positions.

In the case of one well known make of block cheese, the blocks measure 3¼ in. by 3¾ in. by 275 mm. and these blocks always weigh 5 lbs. or slightly over 5 lbs., the slight margin being provided to prevent the weight falling below 5 lbs. by evaporation. With blocks of this size the stop plates would be positioned with the following distances between the insides of the plates and the outside of the knife:

2 lbs. would correspond to 110 mm.
1 lb. would correspond to 55 mm.
½ lb. would correspond to 27.5 mm.
¼ lb. would correspond to 13.75 mm.

The loose coupling of the selector keys to the stop plates by means of offset pins and slots enables the whole of the selector to be quickly detached from the base for cleansing purposes. The glass cover rests on the base or is ribbed at the base and provided with knurled screws, or other known suitable means, to connect it to the base in such a manner that it is quickly detachable for cleansing purposes.

The frame 21 carrying the stop plates 23 is removably attached to the base by clips 48 which are pivoted to brackets 49 attached to the frame and which are slotted at 50 to engage beneath the heads 51 of pins secured to the base. Consequently, the frame and stop plates may readily be removed for cleansing or other purposes. The frame 21 may be provided with adjusting means to insure the stop plates being positioned at the exactly correct distances from the knife.

The base of the container may be constructed of enameled metal or porcelain or other known suitable material and the cover, although preferably constructed of glass, might be formed of other material.

The cutting of the cheese with its covering of tin foil is facilitated by the use of an adjustable cutting bridge 52 which can thus be set with its edge at the exact distance desired from the plane of cut of the knife.

I claim:

1. In a cutting machine for a commodity of uniform dimensions and density, the combination of a cutter, with means for moving forward said commodity, stop plates, selector keys adapted to move said stop plates into the path of said commodity and to move said cutter out of the path of said commodity, and means for operating said cutter.

2. In a cutting machine for a commodity of uniform dimensions and density, the combination of a cover for said commodity, with a knife blade normally closing the front of said cover, a carrier adapted to support said commodity and to move it forward, selector plates positioned at distances in front of said knife glade which correspond to the weights of the commodity which it is desired to supply, selector keys which actuate said stop plates and which also actuate means causing said knife blade to move out of the path of said commodity, means for actuating said knife blade to cut through said commodity and for simultaneously returning the stop plate in question to its normal position.

3. A cutting machine for a commodity of uniform dimensions and uniform density, having a spring-returned cutter, vertical rods connected to said cutter, a slotted sliding bar, tripping means adapted to be actuated by one of said vertical rods to move said slotted bar across said machine, a shoulder on the other of said rods, shoulders formed by a slot in said sliding bar adapted to engage said shoulder on said vertical rod, weight selector means, means for loosely connecting said sliding bar to said selector means so that actuation of said cutter returns said selector means to its normal position whilst actuation of said selector means returns said sliding bar to its initial position and releases said knife.

4. In a cutting machine for a commodity of uniform dimensions and uniform density, a cutting knife, a series of selector plates positioned at distances from said cutting knife which correspond to the weights of the commodity to be cut, a frame carrying said selector plates, keys adapted to actuate said selector plates, means loosely coupling said keys to said selector plates, a base supporting all of said parts, and means for detachably connecting said frame to said base so that said frame and said plates may be removed for cleaning.

Signed at Melbourne this 13th day of March, 1931.

DAVID JOHN BRADSHAW.